United States Patent
Kataria et al.

(10) Patent No.: US 7,633,962 B2
(45) Date of Patent: Dec. 15, 2009

(54) METHODS AND APPARATUS FOR MINIMIZING SEQUENCE IDENTIFIER DIFFERENCE OF SIMULTANEOUSLY TRANSMITTED CELLS

(75) Inventors: Deepak Kataria, Edison, NJ (US); Codrut Radu Radulescu, Hillsdale, NJ (US)

(73) Assignee: Agere Systems Inc., Allentown, PA (US)

( * ) Notice: Subject to any disclaimer, the term of this patent is extended or adjusted under 35 U.S.C. 154(b) by 603 days.

(21) Appl. No.: 11/193,799

(22) Filed: Jul. 29, 2005

(65) Prior Publication Data

US 2007/0025356 A1 Feb. 1, 2007

(51) Int. Cl.
H04L 12/54 (2006.01)

(52) U.S. Cl. .................... 370/428; 370/394; 370/395.3; 370/412

(58) Field of Classification Search .............. 370/230, 370/231, 232, 394, 395.1, 395.3, 395.7, 395.71, 370/412, 413, 414, 415, 416, 417, 516, 543, 370/428, 429
See application file for complete search history.

(56) References Cited

U.S. PATENT DOCUMENTS

| | | | | |
|---|---|---|---|---|
| 6,330,223 | B1 * | 12/2001 | Shimonishi | 370/230 |
| 6,535,487 | B1 * | 3/2003 | Biswas et al. | 370/236.1 |
| 7,292,602 | B1 * | 11/2007 | Liu et al. | 370/468 |
| 2002/0057697 | A1 * | 5/2002 | Yamamori et al. | 370/395.2 |
| 2002/0136230 | A1 * | 9/2002 | Dell et al. | 370/416 |
| 2002/0154637 | A1 * | 10/2002 | Keller-Tuberg | 370/394 |
| 2003/0169755 | A1 * | 9/2003 | Ternovsky | 370/412 |
| 2003/0219019 | A1 * | 11/2003 | Wilson | 370/395.1 |
| 2005/0286424 | A1 * | 12/2005 | Peeters et al. | 370/235 |
| 2006/0095608 | A1 * | 5/2006 | Seto | 710/52 |
| 2006/0176900 | A1 * | 8/2006 | Liu et al. | 370/465 |

* cited by examiner

*Primary Examiner*—Ricky Ngo
*Assistant Examiner*—Wei-Po Kao
(74) *Attorney, Agent, or Firm*—Ryan, Mason & Lewis, LLP

(57) ABSTRACT

A method of minimizing SID difference of simultaneously transmitted cells in two or more data communication lines is provided. A data transmission speed of each of the two or more data communication lines is identified. A fullness threshold of at least one buffer of two or more buffers in a transmit node is configured in relation to a size of a data cell for transmission. The two or more buffers correspond to respective ones of the two or more data communication lines. The at least one buffer communicates with a given one of the two or more data communication lines having a data transmission speed slower than another of the two or more data communication lines. One or more data cells for transmission are assigned to the two or more buffers of the two or more data communication lines at the transmit node. The one or more data cells are transmitted from the transmit node to a receive node in accordance with the data transmission speeds of the two or more data communication lines. The fullness threshold of the at least one buffer controls assignment of data cells to the at least one buffer during data cell transmission on the given data communication line and minimizes SID difference of simultaneously transmitted cells in the two or more data communication lines.

20 Claims, 2 Drawing Sheets

METHODS AND APPARATUS FOR MINIMIZING SEQUENCE IDENTIFIER DIFFERENCE OF SIMULTANEOUSLY TRANSMITTED CELLS

FIELD OF THE INVENTION

The present invention relates generally to a set of bundled data communication lines, and more particularly to techniques for minimizing sequence identifier (SID) difference of simultaneously transmitted data cells in a set of bundled data communication lines.

BACKGROUND OF THE INVENTION

Asymmetric digital subscriber lines (ADSLs) use standard phone lines to deliver high speed data communications by utilizing a portion of a phone line's bandwidth that is not utilized by voice, allowing for simultaneous voice and data transmission. The data transmission over an ADSL is continuously available, and ADSL technology helps to bring full-motion video, telecommuting and high-speed Internet access to a home or business. The line is termed "asymmetric" because it uses most of the channel to transmit downstream to the user, and only a small portion of the channel to receive upstream information from the user. A typical ADSL may deliver upstream at speeds of approximately 16-768 kilobytes per second (kbps) and downstream at speeds of approximately 1.5-10 megabytes per second (Mbps).

Since the origin of ADSL, improvements have been made in the technology in areas such as efficiency, affordability and functionality, resulting in the adoption of new standards. ADSL2 standards, completed and approved by the International Telecommunications Union (ITU) in 2002, supersede existing ADSL standards. Additionally, ADSL2+, approved by the ITU in January 2003, doubles the downstream bandwidth of ADSL2 to as much as approximately 25 Mbps.

Loop bonding technology provides the telecommunications industry with a revolutionary technique for combining multiple data communication lines, such as ADSL2 and ADSL2+ connections, together into a single, aggregated connection, even if the multiple connections have different capacities. In January 2005, the ITU passed the G.998.1 (G.Bond-ATM) standard. G.Bond-ATM enables ADSL equipment to electronically bond together ADSL2 or ADSL2+ links using multiple copper phone lines, which can then be used to dramatically increase the bandwidth provisioned to subscribers, via a single asynchronous transmission mode (ATM) data stream, to approximately 45 Mbps. These ultra-high data rates support advanced services such as broadcast video and video on demand for customers otherwise out of reach because of their distance from the central office or digital loop carrier (DLC). Even multiple streams of high-definition television can be supported using bonded ADSL2+. The bonding, or other type of bundling, may be automated using software.

Disparate data rates may be supported among the bundled of lines, for example, up to a ratio of 4:1. If some lines have lower capacity than others, it is not necessary to reduce the data rates on the other lines.

However, along with the benefits resulting from the ability to bundle and support disparate data rates among the set of bundled data communication lines come several disadvantages. Cells are assigned to lines in an order in accordance with their associated SIDs. However, the SID difference between simultaneously transmitted cells on different ADSLs may increase due to the different data transmission speeds of the different lines. Buffers in a transmit node, corresponding to the ADSLs, that accept multiple cells and operate using a simple round robin cell assignment technique, may result in large SID differences. This is due to the fact that buffers associated with slow data communication lines may not be restricted from accepting cells with consecutively numbered SIDs. A reorganization procedure at a receive node is initiated because ATM cells are received in a different sequence than that in which they were assigned to the lines, due to the differing line speeds. Thus, those cells arriving before their proper placement in the sequence, based on their SID, are buffered in a memory until the proper position in the sequence is reached. The reorganization procedure must wait for the longest delayed cell that is out of order.

Accordingly, what is needed is an improved approach to minimizing SID difference in simultaneously transmitted cells resulting from cell transmission delay in a set of bundled data communication lines.

SUMMARY OF THE INVENTION

The present invention in an illustrative embodiment provides techniques for minimizing SID difference of simultaneously transmitted cells in a set of bundled data communication lines.

In accordance with one aspect of the invention, a method of minimizing SID difference of simultaneously transmitted cells in two or more data communication lines is provided. A data transmission speed of each of the two or more data communication lines is identified. A fullness threshold of at least one buffer of two or more buffers in a transmit node is configured in relation to a size of a data cell for transmission. The two or more buffers correspond to respective ones of the two or more data communication lines. The at least one buffer communicates with a given one of the two or more data communication lines having a data transmission speed slower than another of the two or more data communication lines. One or more data cells for transmission are assigned to the two or more buffers of the two or more data communication lines at the transmit node. The one or more data cells are transmitted from the transmit node to a receive node in accordance with the data transmission speeds of the two or more data communication lines. The fullness threshold of the at least one buffer controls assignment of data cells to at least one buffer during data cell transmission on the given data communication line, and minimizes SID difference of simultaneously transmitted cells in the two or more data communication lines.

In the illustrative embodiment, the fullness threshold is less than a size of a data cell for transmission. The fullness threshold of the two or more buffers are configured to be substantially inversely proportional to a data transmission speed of the respective ones of the two or more data communication lines. The fullness threshold of the at least one buffer of the two or more buffers prohibits the assigning of an additional data cell until a previously assigned data cell has completed transmitting. Cells with consecutive SIDs are prohibited from being transmitted from the at least one buffer of the two or more buffers.

In accordance with another aspect of the invention, a transmit node for two or more data communication lines comprises two or more buffers. The two or more buffers communicate with respective ones of the two or more data communication lines. At least one of the two or more buffers has a fullness threshold configured in relation to a size of a data cell for transmission, and communicates with a given one data communication line of the two or more data communication lines having a data transmission speed slower relative to another of the two or more data communication lines.

In additional illustrative embodiments, the transmit node further comprises a scheduler that assigns data cells for transmission to the two or more buffers. The data cell for transmission comprises a fixed-size packet application, for example, an ATM data cell of an ATM data stream. The two or more data communication lines comprise a set of bundled parallel data communication lines having differing data transmission speeds, and the two or more data communication lines are bundled in accordance with a G.Bond standard.

Advantageously, the present invention in the illustrative embodiments prevents cells from stalling in low speed ADSL buffers while other faster ADSLs are transmitting subsequent cells. The embodiments of the present invention also reduce the overall expense of the G.Bond equipment by reducing the buffer size necessary for reorganization at a receive node. More specifically, the present invention allows for implementation of a reorganization engine, for example, in a low cost field programmable gate array (FPGA).

DETAILED DESCRIPTION OF THE INVENTION

The invention will be illustrated herein in conjunction with exemplary communication systems comprising one or more bidirectional data communication lines. It should be understood, however, that the invention is more generally applicable to any system comprising two or more data communication lines in which it is desirable to minimize SID difference in simultaneously transmitted cells resulting from cell transmission delay.

Figure 1:
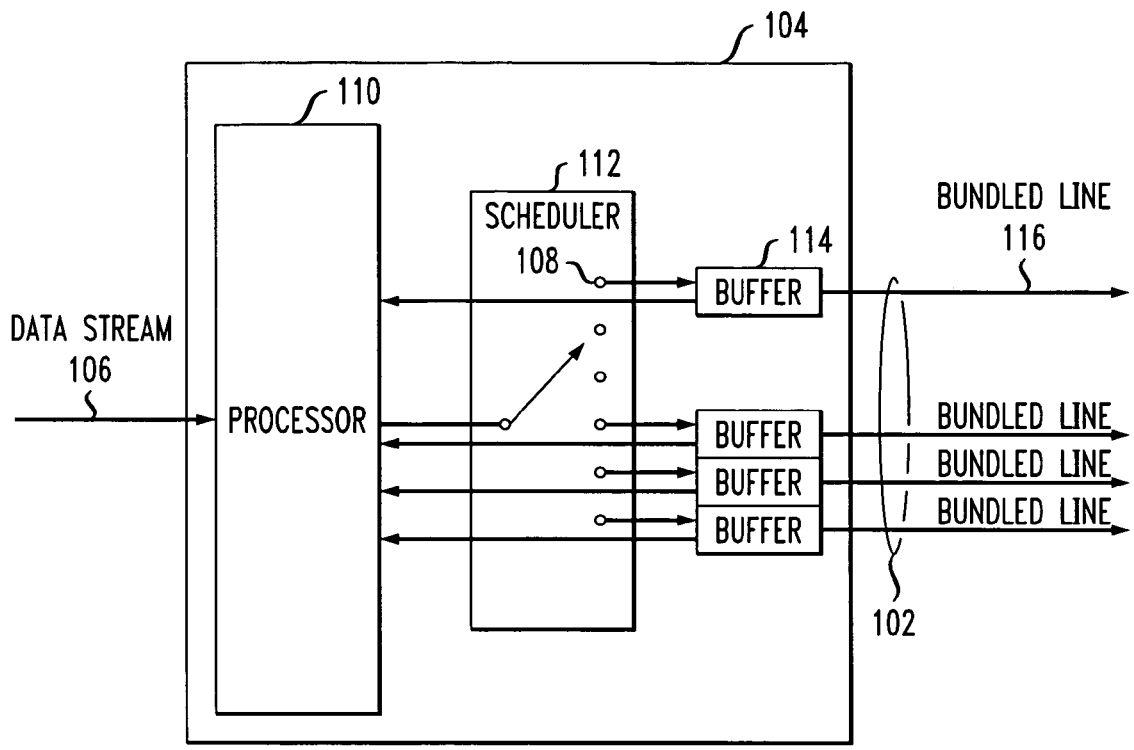
FIG. 1 is a block diagram illustrating a set of bundled data communication lines at a transmit node, according to an embodiment of the present invention.

Referring initially to FIG. 1, a block diagram illustrates a set of bundled data communication lines 102 at a transmit node 104, according to an embodiment of the present invention. A data stream 106 is received at transmit node 104. Data stream 106 is broken up into multiple data cells 108 by a processor 110 of transmit node 104. Data cells 108 are fed into a scheduler 112 of transmit node 104. In accordance with the embodiments of the present invention, data cells 108 are provided as a result of a fixed size packet application, for example, an ATM data cell of an ATM data stream. Scheduler 112 assigns data cells 108 to buffers 114. Each buffer 114 is associated with an individual bundled data communication line 116 in set of bundled data communication lines 102. Bundled data communication lines 102 may incorporate any bundled parallel data communication lines which may have differing data transmission speeds, for example, ADSL, ADSL2, ADSL2+ or very high bit-rate digital subscriber line (VDSL).

Each buffer 114 also has a specified fullness threshold, that defines a maximum size that buffer 114 is capable of storing, and which forces back-pressure from buffer 114 to scheduler 112 when buffer 114 is full. This enables scheduler 112 to fill buffers 114 in accordance with the space that is available in buffers 114. The fullness threshold of buffer 114 associated with a slowest bundled line 116 is such that slowest bundled data communication line 116 can not accept an additional data cell until the previously assigned data cell has finished transmitting. Thus, a slowest bundled data communication line 116 is prohibited from transmitting cells with consecutive SIDs. As described herein, when determining whether a buffer is full according to the fullness threshold, the measurement does not include the size of the cell currently transmitting.

Figure 2:
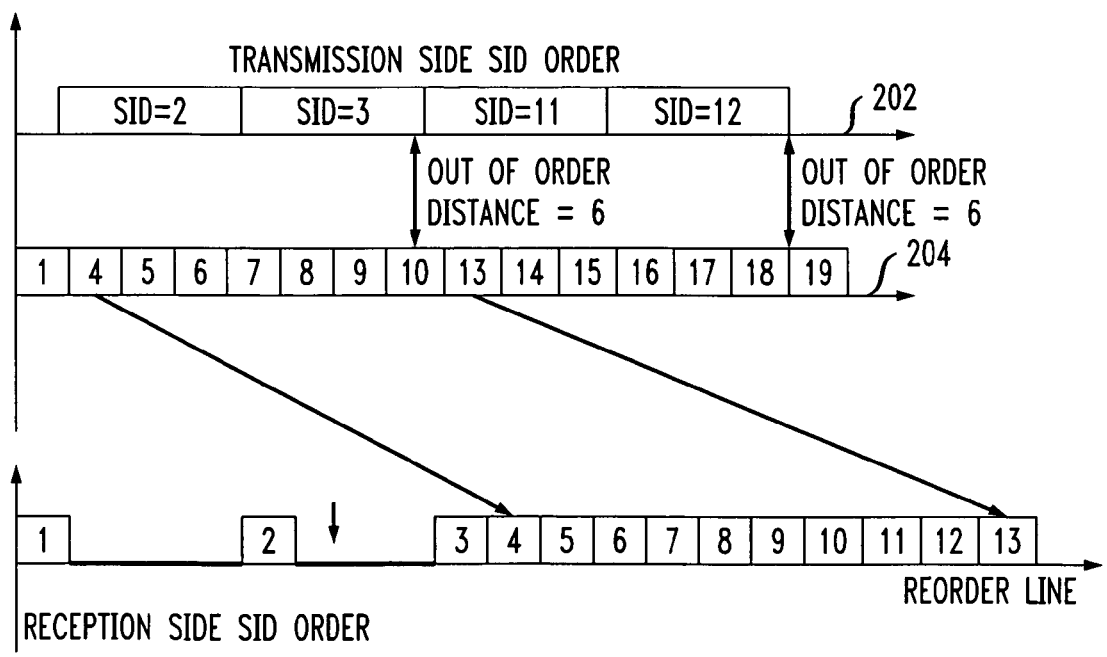
FIG. 2 is a diagram illustrating cell sequence at transmit and receive nodes without a specified fullness threshold for a buffer of a slow line in a set of bundled data communication lines.

Referring now to FIG. 2, a diagram illustrates cell sequence at transmit and receive nodes without a specified fullness threshold for a buffer of a slow line of a set of bundled data communication lines. Each cell is provided with a SID indicating the desired cell order. Two data communication lines are shown at the transmit node, a slow line 202 and a fast line 204. The numbered cells on each line are those cells transmitted by that particular line, and the length of each cell along the line generally corresponds to the transmission time of that cell over that data communication line. In the embodiment shown in FIG. 2, cells are assigned to data communication lines in the order of their SIDs. Cell 1 is assigned to fast line 204, while cells 2 and 3 are assigned to slow line 202. Thus, it is evident that a buffer is provided for slow line 202 that is able to store a full cell while a previously assigned cell is transmitting.

Due to the relative speeds of the lines, cells 4-10 are assigned to fast line 204. The relatively fast transmission of fast line 204 provided available space in its buffer, while the buffer of slow line 202 was unable to accommodate additional cells because cell 3 remained in the buffer as cell 2 was slowly transmitting. As shown, cells 4-6 are transmitted before cell 2, and cells 7-9 are transmitted before cell 3. Thus, the maximum SID difference of simultaneously transmitted cells in this example is six. Cells 4-9 are stored in a memory at the reception side until cells 2 and 3 are received. Therefore, in the embodiment illustrated in FIG. 2, a memory, or buffer, capable of storing six cells is required at the receive node for reordering purposes.

Figure 3:
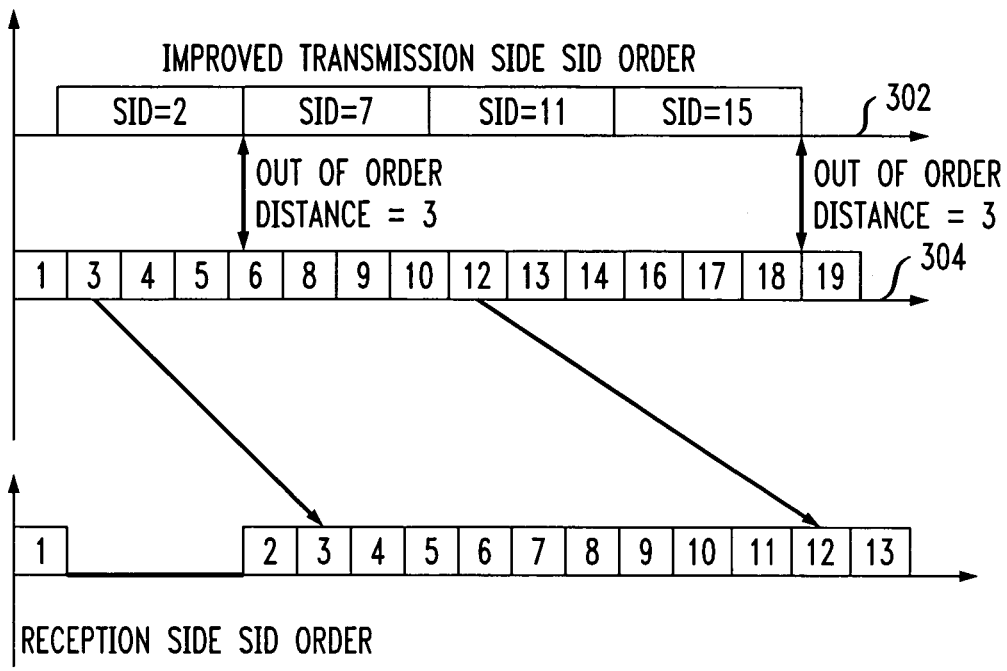
FIG. 3 is a diagram illustrating cell sequence at transmit and receive nodes with a specified fullness threshold for a buffer of a slow line in a set of bundled data communication lines, according to an embodiment of the present invention.

FIG. 3 shows cell sequence at transmit and receive nodes similar to that of FIG. 2. However, in FIG. 3, a specified fullness threshold is provided for a buffer of a slow line 302, according to an embodiment of the present invention. Cell 1 is assigned to a fast line 304 and cell 2 is assigned to slow line 302. Due to a fullness threshold in the buffer of slow line 302, an additional cell is unable to be assigned to slow line 302 until the transmission of cell 2 is complete. Thus, cells 3-6 are assigned to fast line 304 while cell 2 is transmitted over slow line 302. Since cells 3-5 arrive before cell 2 they are stored in a memory or buffer at the receive node. Once the transmission of cell 2 is complete, cell 7 is assigned to slow line 302. Cells 8 and 9 transmit before cell 7, and similarly, cells 12 and 13 transmit before cell 11, and cells 16-18 transmit before cell 15. Thus, the maximum SID difference of simultaneously transmitted cells is three. Establishing a fullness threshold at slow line 302, and preventing assignment of a cell to slow line 302 until transmission of the previous cell is complete, results in a decrease in cell delay from six to three, and thus, a decrease in the memory needed at the receive node to buffer cells that are received out of order.

The problem of SID difference of simultaneously transmitted cells becomes more pronounced when more lines are provided in the bundle of data communication lines. For example, four lines may be bundled with speed transmission ratios of 1:4:4:4. Through a virtual bond analyzing method, the analysis of any number of lines is reduced to the analysis of a pair of lines. To analyze the slowest line behavior in an M-line G.bond bundle, where the faster lines, N=M−1, are converted into a single virtual line having equivalent behavior of all N lines. Bandwidth for the virtual bonded line is the sum of all individual lines bandwidth.

Therefore, in the four data communication lines example provided above, the bundle may be reduced to two lines for the purpose of analysis with a virtual speed ratio of 1:12. In accordance with embodiments of the present invention, when the fullness threshold of a buffer of the slowest line is properly configured as in FIG. 3, this configuration results in a maximum cell delay, or SID difference of 12 cells. If the fullness threshold of the buffer associated with the slowest line is not properly configured in accordance with the embodiments of the present invention, the SID difference may increase by multiples of 12, for example, 24, 36 or 48, depending on how many consecutive cells are able to be stored in the buffer of the slowest line.

Figure 4:
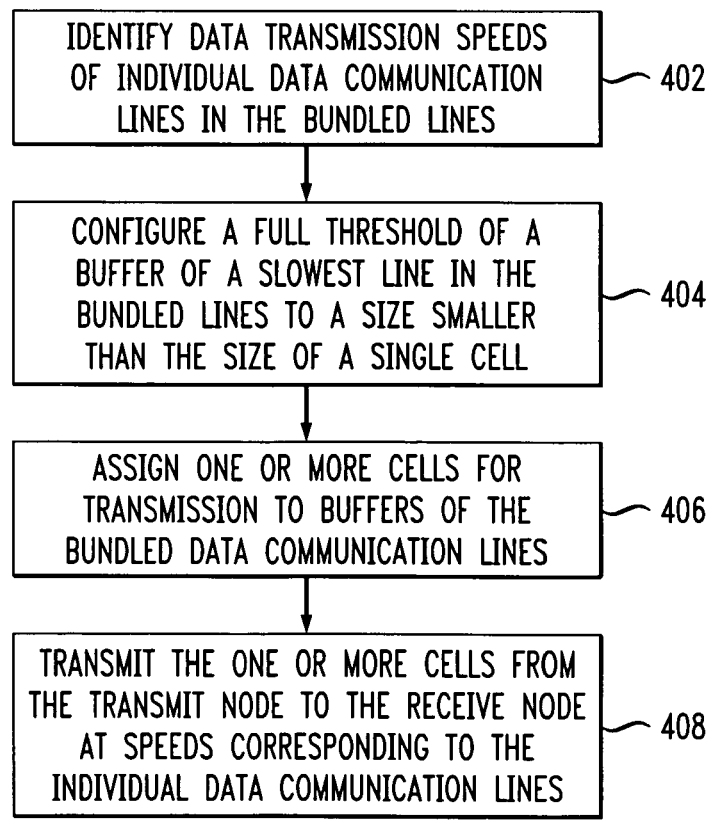
FIG. 4 is a flow diagram illustrating a SID difference minimization methodology for simultaneously transmitted cells in a set of bundled data communication lines, according to an embodiment of the present invention.

Referring now to FIG. 4, a flow diagram illustrates a SID difference minimization methodology of simultaneously transmitted cells in a set of bundled data communication lines, according to an embodiment of the present invention. The methodology begins in block 402 where the speeds of the individual data communication lines in the set of bundled lines are identified. This results in the formation of a transmission speed ratio for the set of bundled data communication lines and the identification of the slowest data communication line. It is possible for the data transmission speeds of the lines to vary with time. Thus, the speed ratio may be dynamic in that it is continuously adjusted in accordance with the identified data transmission speeds.

In block 404, the fullness threshold of a buffer of a slowest line in the set of bundled data communication lines is configured to a size that is smaller than a size of a single cell. This fullness threshold for buffer size does not include the size of a cell that is currently transmitting. This configuration allows the slowest line to force back-pressure to a cell scheduler so that a cell cannot be assigned to the buffer of the slowest line while a previously assigned cell is transmitting. A benefit will be provided in any embodiment of the present invention in which the fullness threshold of the slowest data communication line is smaller than the other lines, thus different fullness thresholds may be utilized in relation to data cell size.

Additionally, the fullness threshold of every buffer in the system may also be configured, preferably in a manner inversely proportional to the speed of a corresponding data communication line. When a speed ratio of the set of bundled data communication lines is dynamically adjusted, as described above in block 402, the fullness thresholds of the buffers may also be continuously adjusted in accordance with the identified data transmission speeds of the corresponding data communication lines.

In block 406, one or more cells are assigned for transmission to the set of bundled data communication lines. The cells are preferably initially assigned to the buffers in a round robin format. The buffers are then continuously checked in this round robin format and cells are assigned to a buffer when it is determined that space is available in the buffer. For example, utopia polling will test every line, for example 24 or 32 lines, in less time than a cell transmission interval, considering 25 mbps. Thus, there will always be less than two full cells in a buffer and a new cell may be transferred to the buffer before starvation. The configured size of the buffer of the slowest line prevents assignment of a cell to the buffer, thus, a cell is only assigned to the slowest line upon completion of transmission of the previously assigned cell.

In block 408, cells are transmitted from the transmit node to the receive node at speeds corresponding to the individual data communication lines. The transmission of the cells and resulting reordering of cells due to differing data transmission speeds is shown and described above with regard to FIGS. 2 and 3. Those cells transmitted out of order, are preferably stored at the receiver node until all cells having smaller SIDs have arrived. Because the SID difference of simultaneously transmitted cells has been minimized, the reorganization of transmitted cells may be implemented by a device with limited memory, such as an FPGA device.

The present invention may be implemented in the form of one or more integrated circuits. For example, a given system node in accordance with the invention may be implemented as one or more integrated circuits comprising at least one processor and at least one memory. Numerous other configurations are possible.

In such an integrated circuit implementation, a plurality of identical die are typically formed in a repeated pattern on a surface of a semiconductor wafer. Each die includes a device described herein, and may include other structures or circuits. The individual die are cut or diced from the wafer, then packaged as an integrated circuit. One skilled in the art would know how to dice wafers and package die to produce integrated circuits. Integrated circuits so manufactured are considered part of this invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of minimizing sequence identifier (SID) difference of simultaneously transmitted cells in two or more data communication lines comprising the steps of:

identifying a data transmission speed of each of the two or more data communication lines;

configuring a fullness threshold of at least one buffer of two or more buffers in a transmit node in relation to a size of a data cell for transmission, wherein the two or more buffers correspond to respective ones of the two or more data communication lines, and the at least one buffer communicates with a given one of the two or more data communication lines having a data transmission speed slower than another of the two or more data communication lines;

assigning one or more data cells for transmission to the two or more buffers of the two or more data communication lines at the transmit node; and transmitting the one or more data cells from the transmit node to a receive node in accordance with the data transmission speeds of the two or more data communication lines;

wherein the fullness threshold of the at least one buffer controls assignment of data cells to the at least one buffer during data cell transmission on the given data communication line and minimizes SID difference of simultaneously transmitted cells in the two or more data communication lines; and wherein the configuring and assigning steps prevent the given data communication line from transmitting data cells with consecutive SIDs;

said identifying, configuring, assigning and transmitting steps being implemented by the transmit node.

2. The method of claim 1, wherein the step of identifying a data transmission speed comprises the step of constructing a speed ratio for the two or more data communication lines.

3. The method of claim 2, wherein, in the step of constructing a speed ratio, the speed ratio is a dynamic speed ratio that varies as the data transmission speeds vary with time.

4. The method of claim 2, wherein the two or more data communication lines comprise three or more data communication lines, and the step of constructing a speed ratio comprises the step of virtually bonding all but the given data communication line by summing data communication line transmission speed ratios.

5. The method of claim 1, wherein, in the step of configuring a fullness threshold, the fullness threshold is less than a size of a data cell for transmission.

6. The method of claim 1, wherein the step of configuring a fullness threshold of at least one buffer comprises the step of configuring the fullness threshold of each of the two or more buffers to be substantially inversely proportional to the data transmission speed of the respective ones of the two or more data communication lines.

7. The method of claim 1, wherein in the step of assigning one or more data cells, the fullness threshold of the at least one buffer of the two or more buffers prohibits the assigning of an additional data cell to the at least one buffer until a previously assigned data cell has completed transmitting.

8. The method of claim 1, wherein the step of assigning one or more data cells comprises the step of assigning the one or more data cells to the two or more buffers in accordance with fullness thresholds of the two or more buffers.

9. The method of claim 1, wherein the step of assigning one or more data cells comprises the step of assigning the one or more cells in a round robin format.

10. The method of claim 1, wherein, in the step of assigning one or more data cells, cells with consecutive SIDs are prohibited from being transmitted from the at least one buffer of the two or more buffers.

11. A transmit node for two or more data communication lines comprising two or more buffers, the two or more buffers communicating with respective ones of the two or more data communication lines, the transmit node being operative to identify a data transmission speed of each of the two or more data communication lines, to assign one or more data cells for transmission to the two or more buffers, and to transmit the one or more data cells to a receive node in accordance with the data transmission speeds of the two or more data communication lines, wherein at least one of the two or more buffers has a fullness threshold configured in relation to a size of a data cell for transmission, and communicates with a given one of the two or more data communication lines having a data transmission speed slower than another of the two or more data communication lines, and further wherein the fullness threshold is configured to be less than the size of the data cell for transmission so as to prevent the given data communication line from transmitting data cells with consecutive SIDs.

12. The transmit node of claim 11, further comprising a scheduler that assigns data cells for transmission to the two or more buffers.

13. The transmit node of claim 12, wherein the fullness threshold of the at least one of the two or more buffers prevents the scheduler from assigning consecutive data cells to the at least one buffer.

14. The transmit node of claim 11, wherein the data cell for transmission comprises a fixed-size packet.

15. The transmit node of claim 14, wherein the fixed-size packet comprises an asynchronous transfer mode (ATM) data cell of an ATM data stream.

16. The transmit node of claim 11, wherein the two or more data communication lines comprise a set of bundled parallel data communication lines having differing data transmission speeds.

17. The transmit node of claim 16, wherein the set of bundled parallel data communication lines comprise at least one of asymmetric digital subscriber line (ADSL), ADSL2, ADSL2+ and very high bit-rate digital subscriber line (VDSL).

18. The transmit node of claim 11, wherein the two or more data communication lines are bundled in accordance with a G.bond standard.

19. The transmit node of claim 11, wherein the two or more buffers each have a fullness threshold substantially inversely proportional to a data transmission speed of a corresponding data communication line of the two or more data communication lines.

20. An integrated circuit device comprising a transmit node for two or more data communication lines comprising two or more buffers, the two or more buffers communicating with respective ones of the two or more data communication lines, the transmit node being operative to identify a data transmission speed of each of the two or more data communication lines, to assign one or more data cells for transmission to the two or more buffers, and to transmit the one or more data cells to a receive node in accordance with the data transmission speeds of the two or more data communication lines, wherein at least one of the two or more buffers has a fullness threshold configured in relation to a size of a data cell for transmission, and communicates with a given one of the two or more data communication lines having a data transmission speed slower than another of the two or more data communication lines, and further wherein the fullness threshold is configured to be less than the size of the data cell for transmission so as to prevent the given data communication line from transmitting data cells with consecutive SIDs.

* * * * *